(12) United States Patent
Hsieh et al.

(10) Patent No.: US 9,726,319 B2
(45) Date of Patent: Aug. 8, 2017

(54) COMBINABLE HANGER APPARATUS

(71) Applicant: SQUAREX INC., New Taipei (TW)

(72) Inventors: Jung-Ya Hsieh, New Taipei (TW);
Ta-Wei Chien, New Taipei (TW);
Yao-Tsung Yeh, New Taipei (TW);
Shu-Ming Wei, New Taipei (TW);
Cheng-Yu Tsai, New Taipei (TW);
Kuo-Wei Lu, New Taipei (TW);
Kuei-Yuan Chen, New Taipei (TW)

(73) Assignee: SQUAREX INC., New Taipei (TW)

( * ) Notice: Subject to any disclaimer, the term of this patent is extended or adjusted under 35 U.S.C. 154(b) by 0 days.

(21) Appl. No.: 15/000,819

(22) Filed: Jan. 19, 2016

(65) Prior Publication Data

US 2016/0312947 A1    Oct. 27, 2016

Related U.S. Application Data

(60) Provisional application No. 62/151,369, filed on Apr. 22, 2015.

(30) Foreign Application Priority Data

Jan. 6, 2016   (TW) .............................. 105100251 A (51) Int. Cl.
*H01R 4/60*     (2006.01)
*F16M 13/02*    (2006.01)

(52) U.S. Cl.
CPC .......... *F16M 13/02* (2013.01); *F16M 13/027* (2013.01)

(58) Field of Classification Search
CPC ...... F16M 13/02; H01R 33/92; H01R 13/514; H01R 13/518
USPC ......................................................... 439/210
See application file for complete search history.

(56) References Cited

U.S. PATENT DOCUMENTS 5,228,261 A * 7/1993 Watkins ................ E04B 1/2612
403/232.1

* cited by examiner

*Primary Examiner* — Javaid Nasri
(74) *Attorney, Agent, or Firm* — Steven Reiss (57) ABSTRACT

An extendable hanger apparatus to which or through which an electrical feed can be connected includes a support base, the support base has a containing groove and at least one support posts. Locating devices and a fastening component are provided on the containing groove, the locating devices configured to fixing the support base on a fixed structure, and fastening components are installed at the two end portions of the support base. The fastening components are configured to enable chaining, and the support post has a support component, the support component is configured to connect with an object for hanging.

8 Claims, 13 Drawing Sheets

COMBINABLE HANGER APPARATUS

FIELD

The subject matter herein generally relates to suspension mechanisms.

BACKGROUND

A conventional hanger apparatus is usually provided with a base and a hanger. The base is for the installment of the hanger, and the hanger is for hanging a suspended object. The base is installed with an integration means for being put on or with a wall surface, a pillar, or a ceiling. The integration means could be a screw, a gel, or an adhesive. Conventional hanger apparatus are not suitable for the demands of spatial display design due to the lack of systematic integration and extensions. Furthermore, if power supplies are required, power distribution devices are hard to add, and the display efficiency of the display design and speed of erection are decreased.

A systematic hanger apparatus that is easy for integration and extension and for power distribution is required.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Implementations of the present technology will now be described, by way of example only, with reference to the attached figures.

DETAILED DESCRIPTION OF EMBODIMENTS

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure relates to hanger apparatus, the hanger apparatus comprising a support base having a containing groove and at least one support post. The containing groove has at least one locating device and a fastening component, the locating device being configured to fix the support base on a wall or other structure. The fastening components are installed at the two end portions of the support base, the fastening component enables the support base to be combined with an adjacent support base. The support post has a support component, the support component is configured to connect with a hanging object.

In the hanger apparatus of this disclosure, the support base is equipped with extensibility function, the fastening component of the end portion of the containing groove of the support base can be mated with other fastening components. The locating device of the containing groove not only fixes the support base, but also provides the capability of installing power distribution devices. The hanger apparatus can efficiently support and feed electrical power to whatever it supports.

Figure 1:
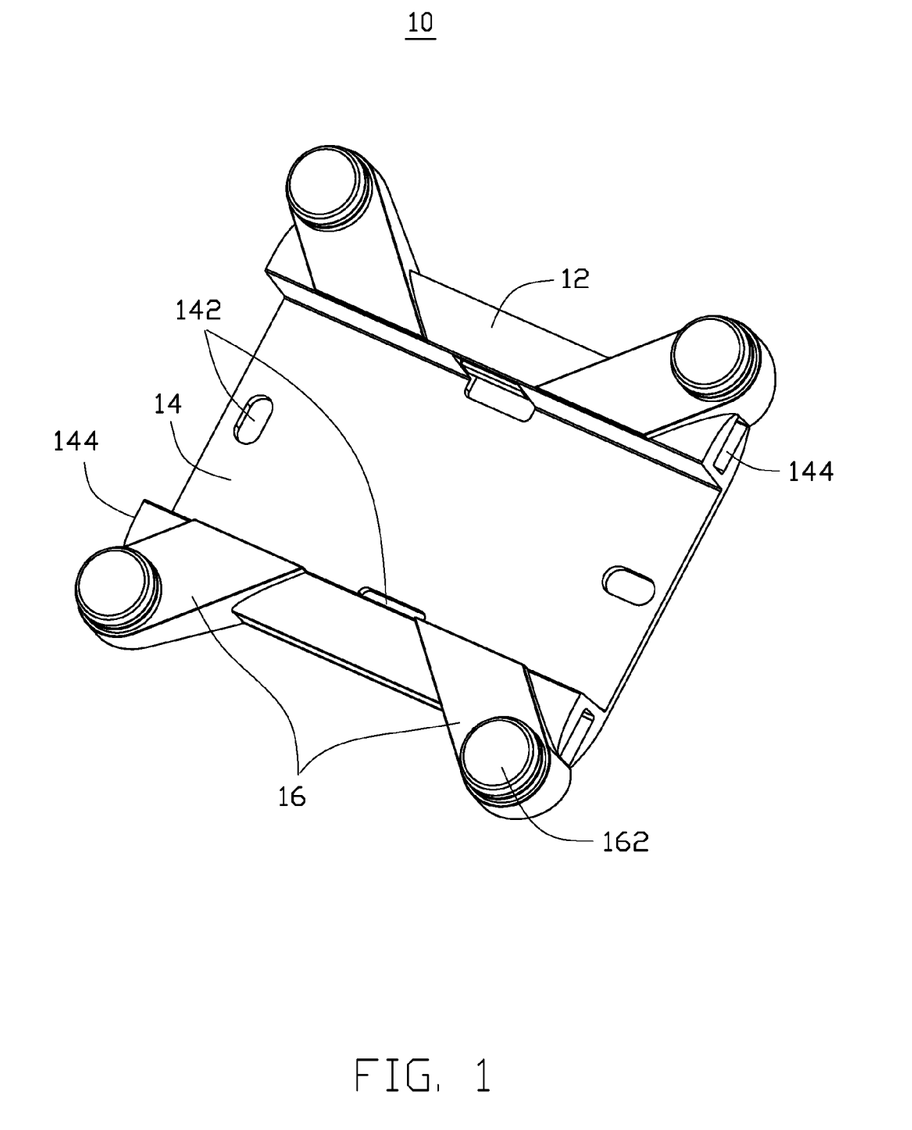
FIG. 1 is a schematic view illustrating an embodiment of the hanger apparatus of the present invention.

FIG. 1 is a view of an embodiment of the hanger apparatus (hanger apparatus 10) of this disclosure. The hanger apparatus 10, comprises a support base 12 having a containing groove 14 and at least one support post 16. The containing groove 14 has at least one locating device 142 and a fastening component 144. The locating device 142 is configured to fix the support base 12 on a fixed structure (not shown in the figure), and the fastening components 144 are installed at the two end portions of the support base 12. The fastening component 144 is configured to enable combinations of support bases 12. The support post 16 has a support component 162, the support component 162 is configured to connect with an object for hanging (not shown in the figure).

Figure 2:
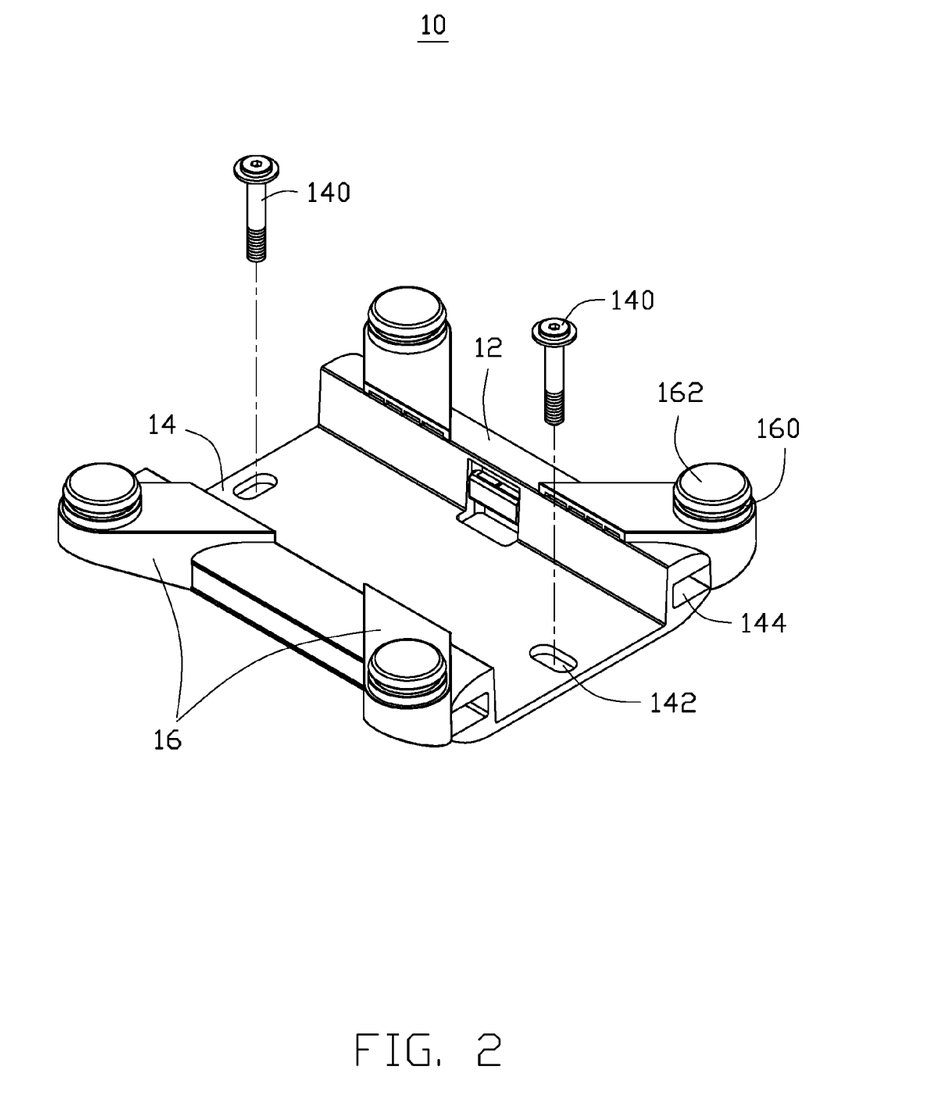
FIG. 2 is a schematic view illustrating the fixing of the support base of the hanger apparatus in FIG. 1.

FIG. 2 illustrates the manner of fixing the support base of the hanger apparatus 10. As shown in the FIG. 2, the locating devices 142 of the support base 12 are installed inside the containing groove 14, and in the present embodiment, the locating devices 142 are fixed holes, screws 140 may go through the fixed holes. The locating devices 142 can be, but are not limited to being, an adhesive, such as gel, tape, Velcro, and others. The adhesive is installed on the rear side of the containing groove 14, which makes the support base 12 easily attachable on the fixed structure. The support component 162 comprises a hooking component, the support component 162 in the present embodiment is a necked protrusion. The necked protrusion is installed at the end portion of the support post 16, a gap 160 exists between the necked protrusion and the support post 16, and by means of eyes or otherwise the object for hanging is hooked in the gap 160.

Figure 3:
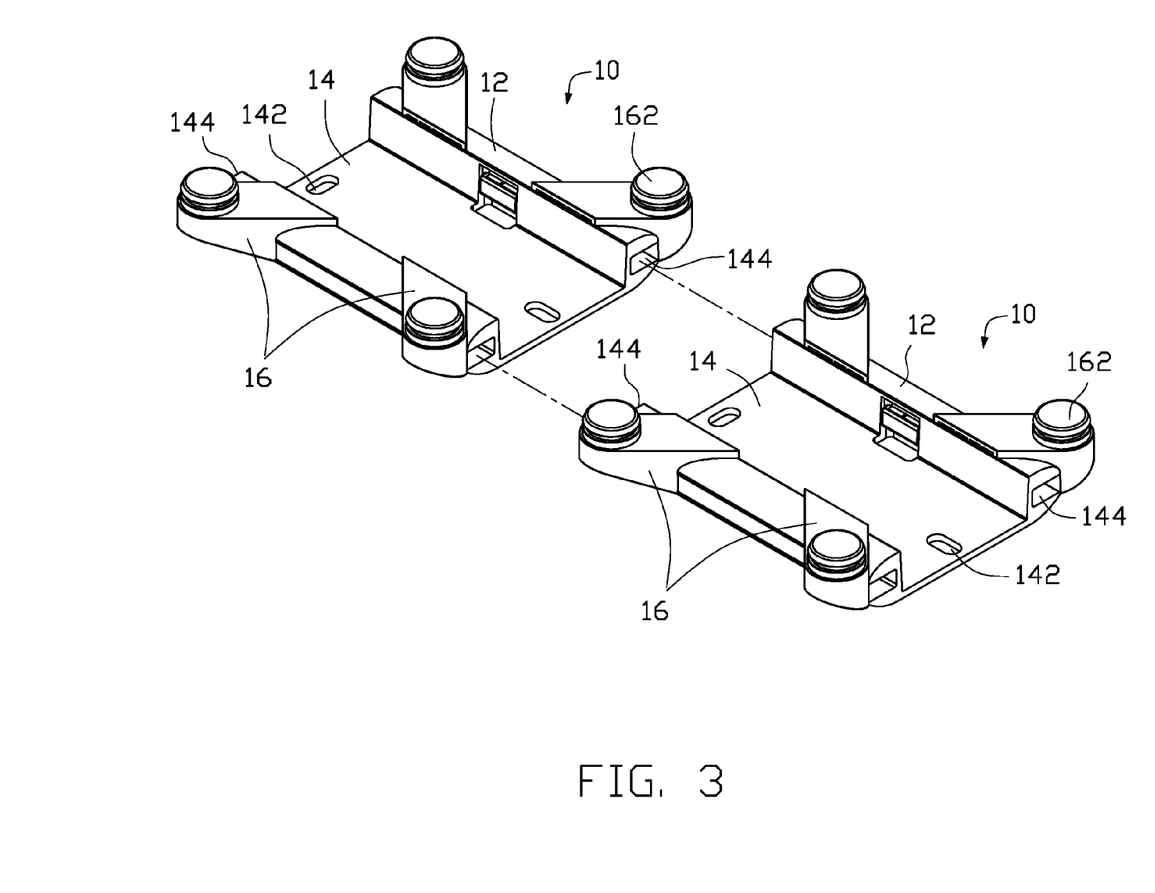
FIG. 3 is a schematic view illustrating a combination of the support bases of the hanger apparatus in FIG. 1.

FIG. 3 illustrates a combination of more than one support base 12 of the hanger apparatus 10. The fastening component 144 of the support base 12 is a component capable of combining with others. For example, the engagement may be a slot to receive a protrusion, or other mechanisms. In the present embodiment, the fastening components 144 are at the two end portions of the support base 12, and are in the form of a concave slot and a protrusion. Two side-by-side support bases 12 can thus be combined through the fastening component 144, and the support base 12 can accordingly be connected and extended.

Figure 4:
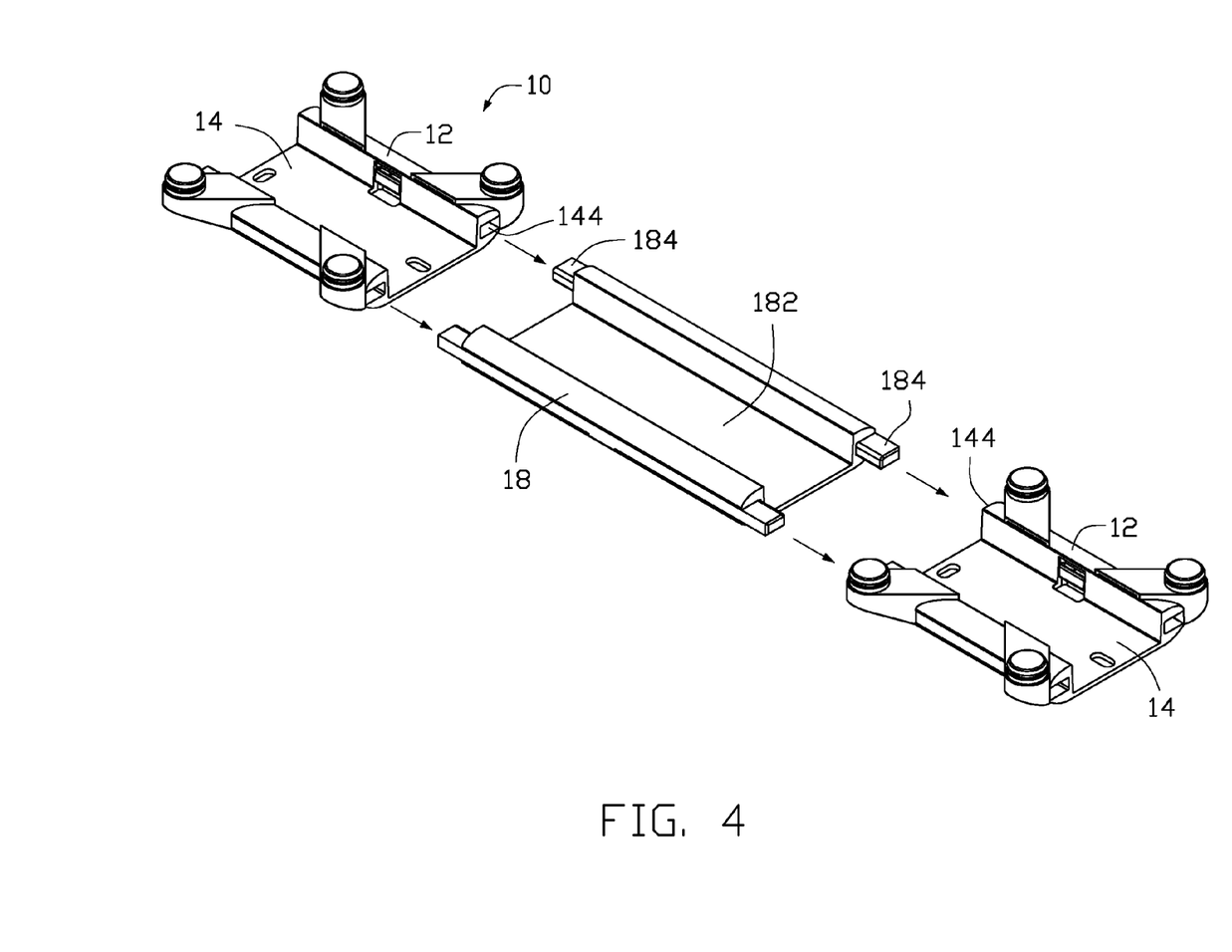
FIG. 4 is a schematic view illustrating another combination of support bases of the hanger apparatus in FIG. 1.

FIG. 4 illustrates another use of combining support bases 12 of the hanger apparatus 10. The hanger apparatus 10 further comprises an expansion component 18 having a slot 182, the slot 182 having the same configuration as the containing groove 14. The two end portions of the slot 182 are provided with connection components 184, and the connection component 184 and the fastening component 144 are configured to be combined. The connection component 184 is a component capable of combining and engaging with the fastening component 144. In the present embodiment, the configuration of the expansion component 18 is as a line-shape. Moreover, the connection components 184 provided at the two end portions of the expansion component 18 are protruding lumps, and the fastening components 144 at the two end portions of the support base 12 are concave slots. The connection component 184 and the fastening component 144 are configured to be combined, which makes the support bases 12 infinitely extendable.

Figure 5:
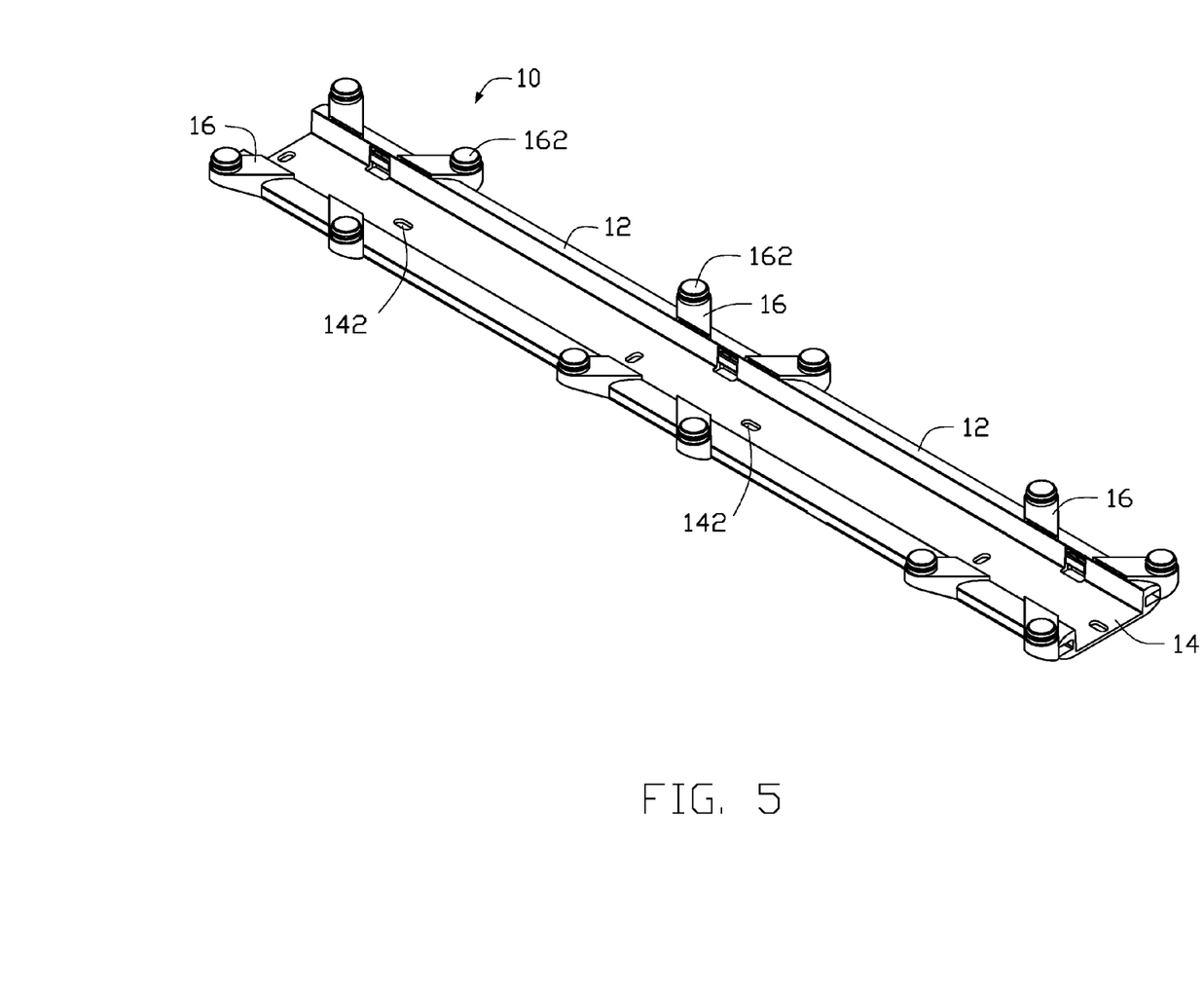
FIG. 5 is a schematic view illustrating another embodiment of the support base of the hanger apparatus in FIG. 1.
Figure 11:
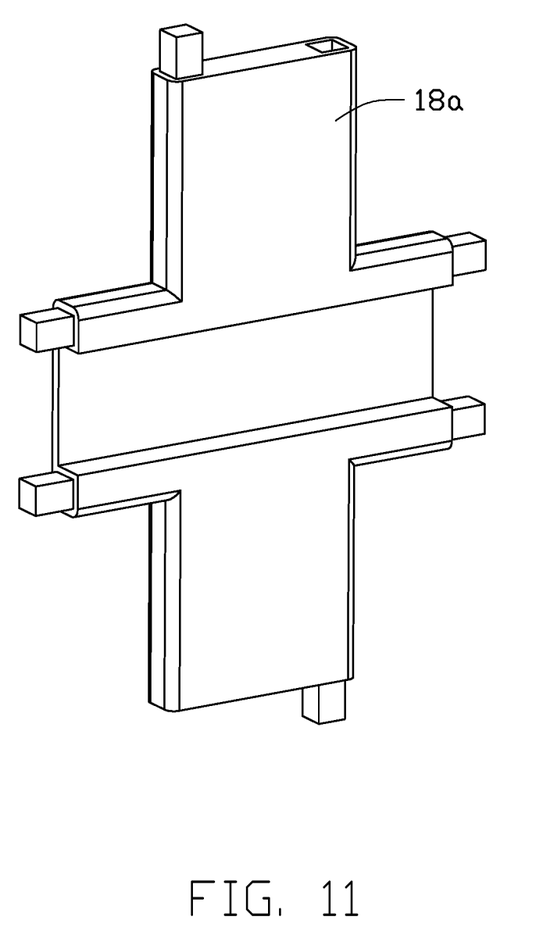
FIGS. 11 to 13 are schematic views illustrating expansion components of the hanger apparatus of the present invention configured in various shapes.
Figure 12:
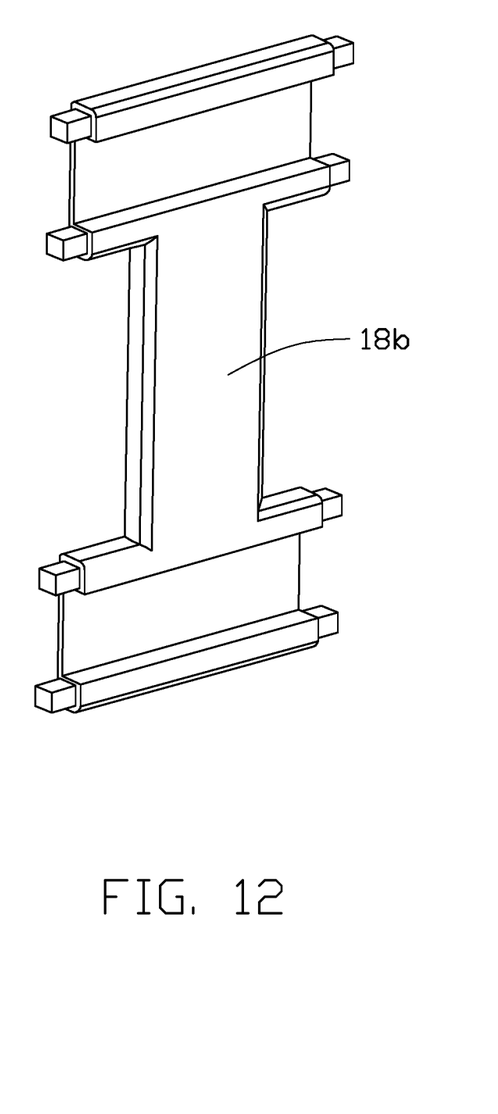
Figure 13:
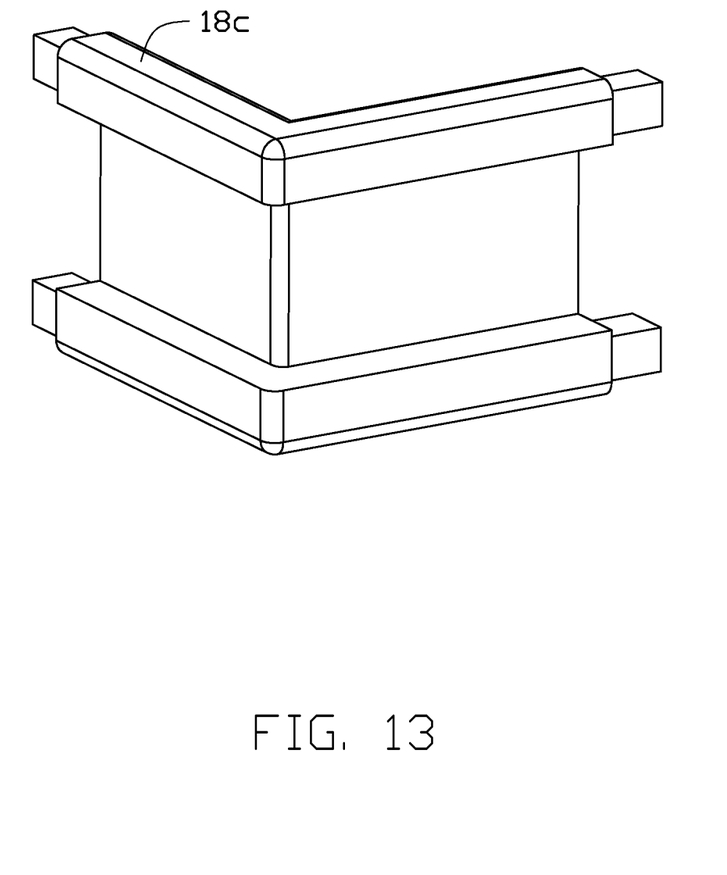

The configuration of the expansion component 18a, 18b, 18c is preferably a cross-shape, an H-shape, or an L-shape as shown in FIGS. 11 to 13. Connection components 184 are also provided at the end portion of the expansion component 18, capable of combining with fastening components 144 of the support base 12. FIG. 5 illustrates another embodiment of the support base 12 of the hanger apparatus 10. The support base 12 is also geometric in shape, wherein the support base 12 is installed with multiple locating devices 142 and support posts 16.

Figure 6:
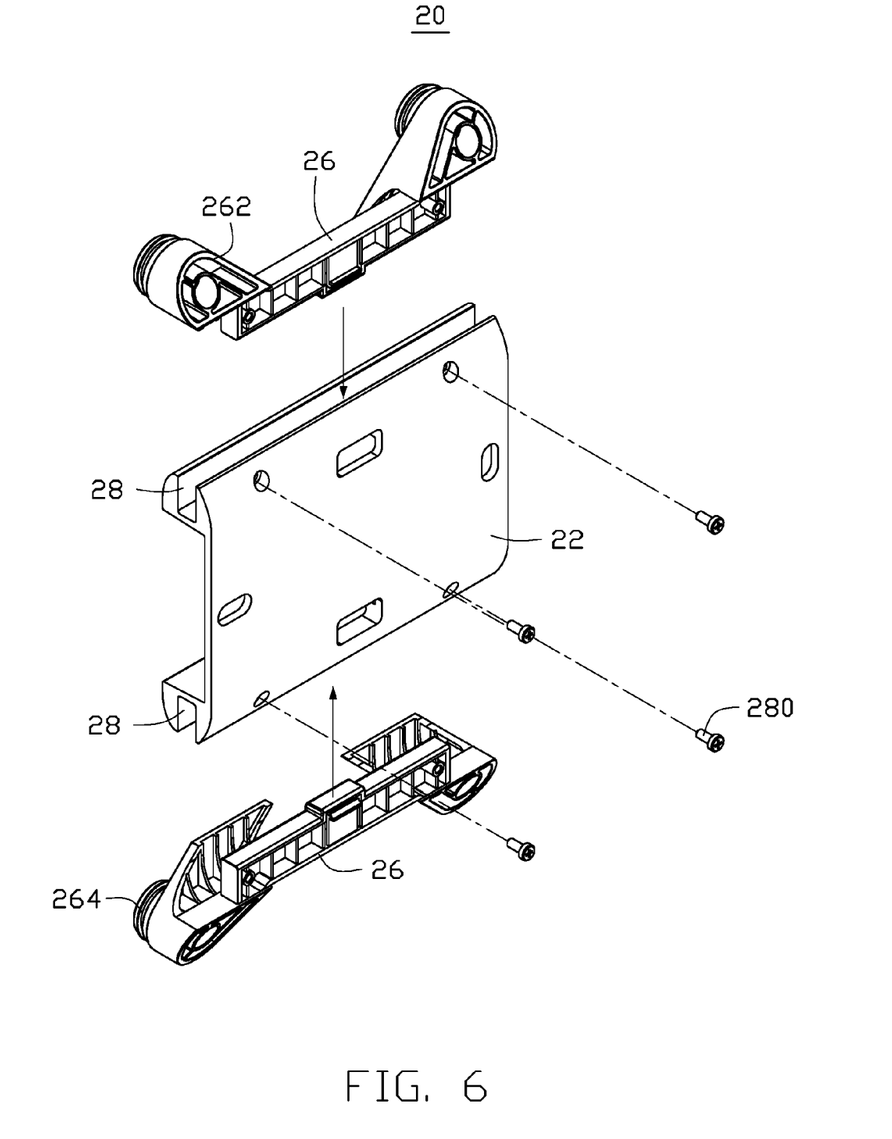
FIG. 6 is an exploded view of the hanger apparatus of FIG. 1.

FIG. 6 illustrates another embodiment of a hanger apparatus. As shown in FIG. 6, the configuration of a hanger apparatus 20 is essentially the same as the hanger apparatus 10. However, the hanger apparatus 20 comprises a support base 22 and at least one support frame 26. The support base 22 has a containing groove 24 and at least one receiving slot 28, and the receiving slot 28 receives the support frame 26. The support frame 26 has at least one support post 262 having support components 264 on it, where the support component 264 is configured to connect with a hanging object (not shown in the figures).

The hanger apparatus 20 carries the support frame 26 through the receiving slot 28 of the support base 22. In the present embodiment, the support frame 26 is installed inside the receiving slot 28, and fixed by a screw 280. By the detachability of the support frame 26, the support base 22 can be combined with different support frames 26 and connect different hanging objects.

Figure 7:
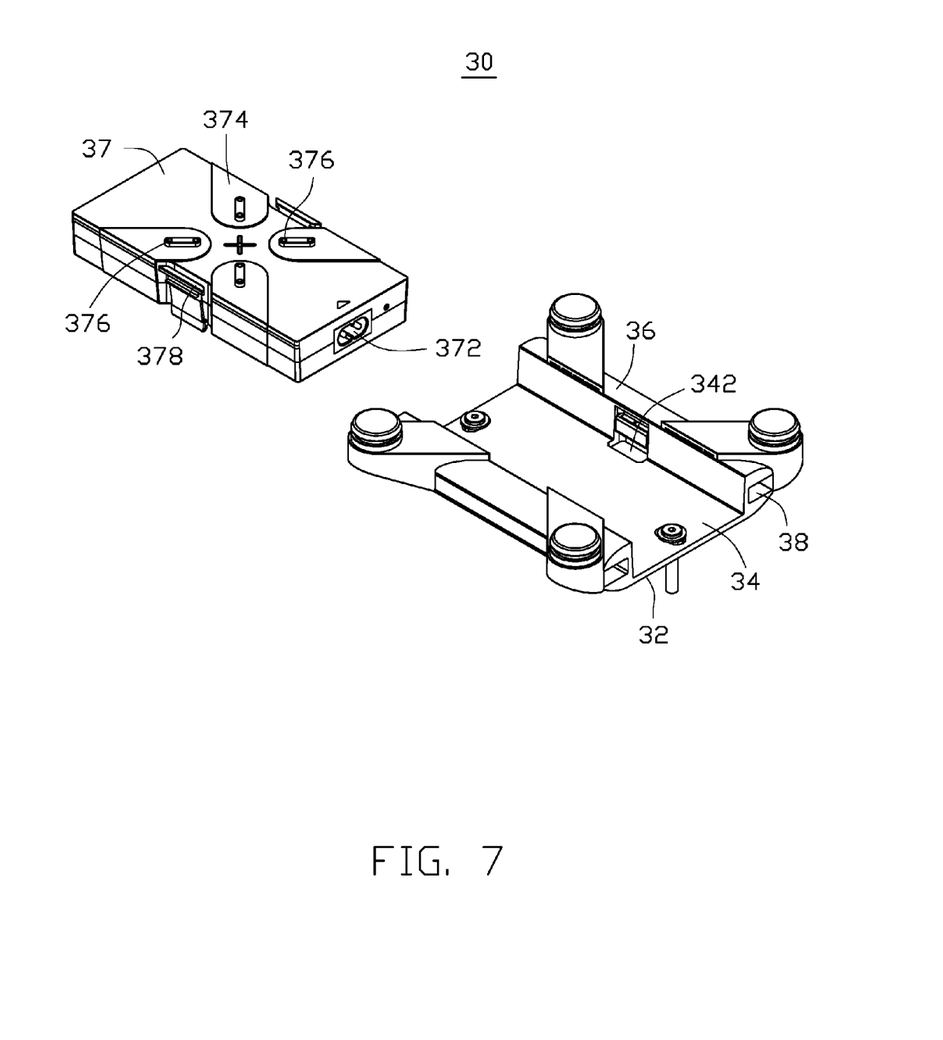
FIG. 7 is a schematic view illustrating a combination of the hanger apparatus of FIG. 1 together with a power carrier.
Figure 9:
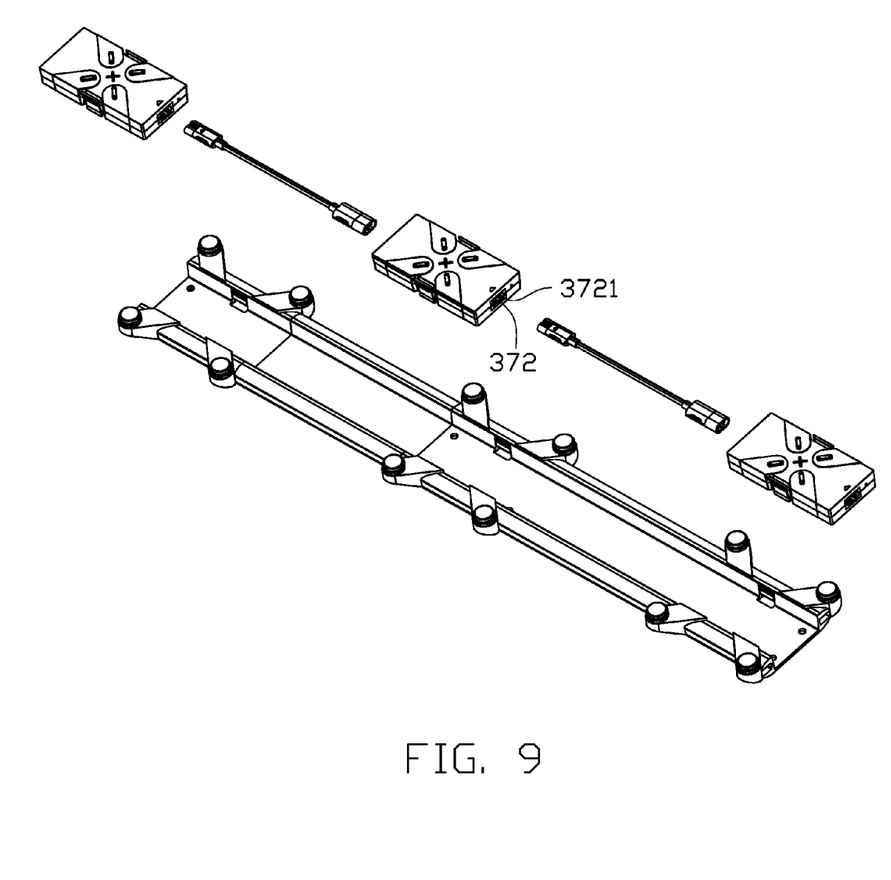
FIGS. 9 and 10 are front and rear exploded views of the hanger apparatus in FIG. 8.
Figure 10:
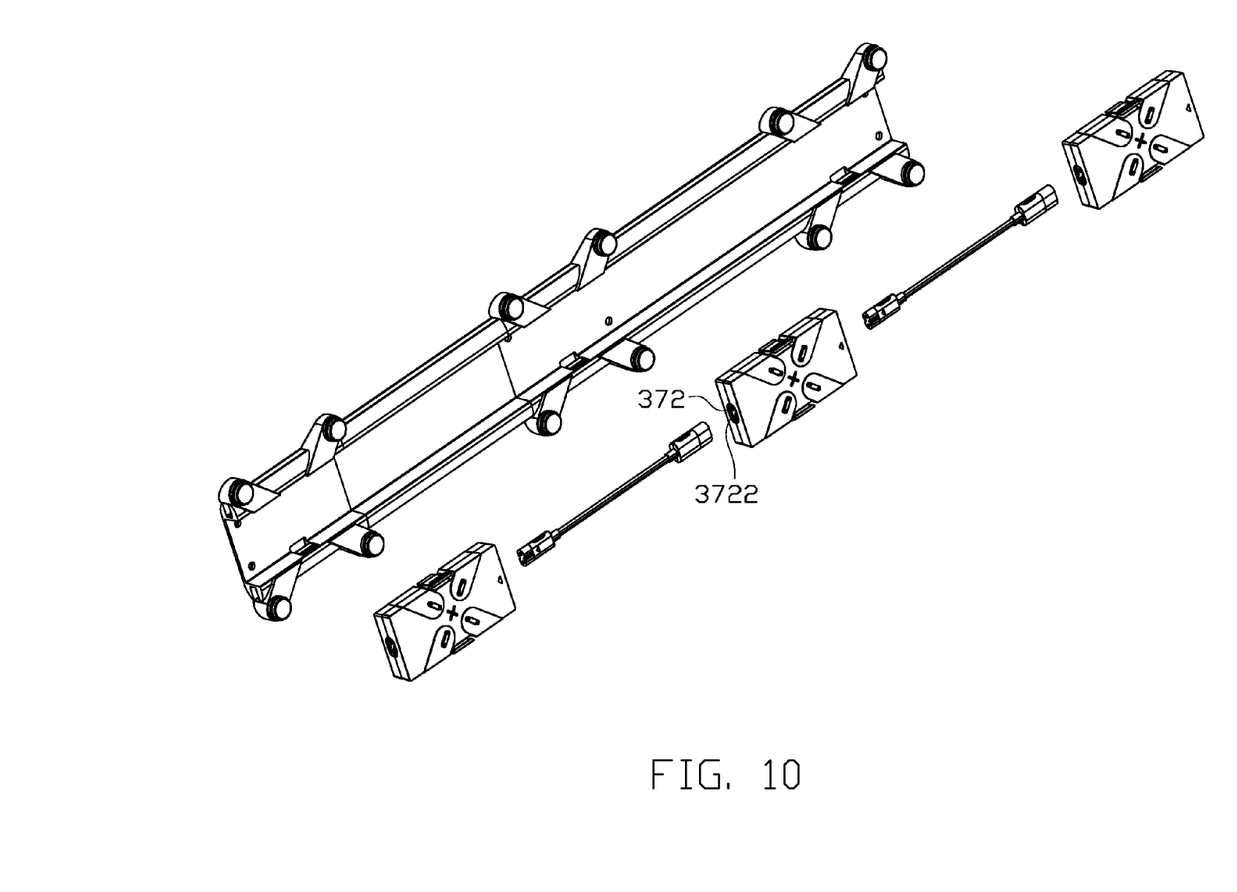

FIG. 7 illustrates another embodiment of a hanger apparatus, namely hanger apparatus 30. The configuration of the hanger apparatus 30 is substantially the same as the hanger apparatus 10 and 20. However, the hanger apparatus 30 comprises a support base 32, at least one support frame 36, and at least one electrical connecting device 37. Further, the support base 32 has a containing groove 34 and at least one receiving slot 38, the support frame 36 being detachably installed on receiving slot 38, and the electrical connecting device 37 is installed inside the containing groove 34. The electrical connecting device 37 has at least one electrical connecting socket 372 and a conductive connector 374. The electrical connecting socket 372 includes at least one input port 3721 and at least one output port 3722 as shown in FIGS. 9 and 10 and connects to a power source (not shown in the figures) and transmits power, the conductive connector 374 has at least one conductive terminal 376 installed at different locations.

In the present embodiment, an elastic buckle 378 is installed in the electrical connecting device 37. The elastic buckle 378 connects with the fixed holes of the locating device 342 of the containing groove 34, allowing easy mounting on the support base 32, and providing power when needed. The conductive terminals 376 installed at different locations can provide different rotation angles for the hanging object when connected, and can direct the power source.

Figure 8:
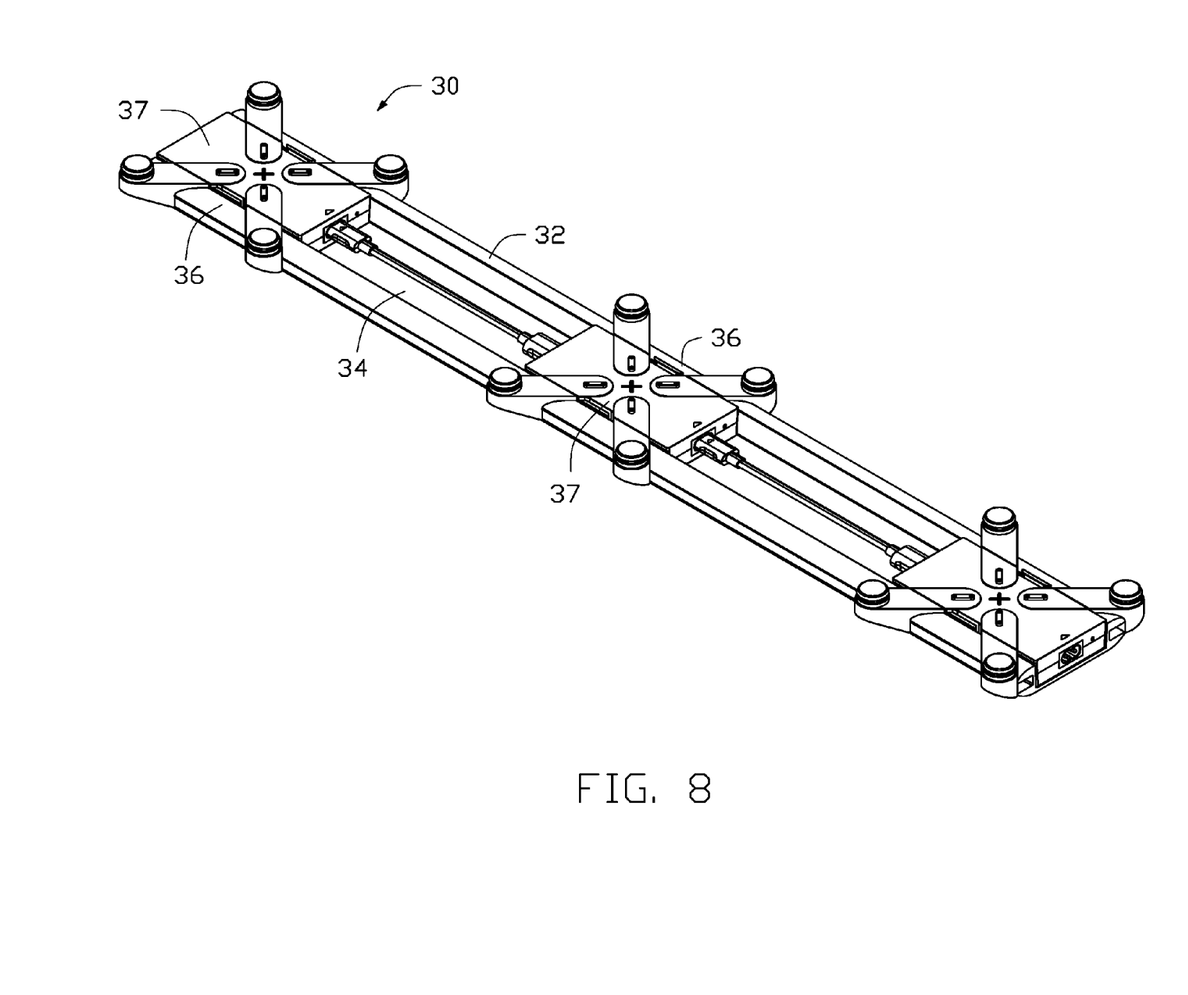
FIG. 8 is a schematic view illustrating the hanger apparatus in FIG. 1 when fully functioning.

FIG. 8 illustrates the use of a support base of a hanger apparatus. The support base 32 of the hanger apparatus 30 is geometric in shape, a fixed base (not shown in the figures) is installed at one side of the support frame 32. Furthermore, the fixed base can be installed on the ground or on the ceiling, allowing the support base 32 to be fixed on the ground or on the ceiling firmly by the fixed base. Thus, the support base 32 with the fixed base at one side is a pedestal support frame that can be fixed firmly, and the pedestal support frame can form the fixed structure. Two fixed bases (not shown in the figures) are installed at the two sides of the support base 32, allowing the support base 32 to be installed on the ground or on the ceiling or in between two walls. Thus, the support base 32 with the fixed bases at its two sides is a vertical support frame that can be fixed firmly, and the vertical support frame forms the fixed structure. The fixture of the hanger apparatus 30 comprises a wall surface, the pedestal or vertical support frame being fixed by the support base. By the connection of the support frame 36 and the hanging object, and the supply of power, a great number of the demands of spatial display are fulfilled.

By the fastening component 144 at the end portions of the containing grooves 14, 24, and 34 of the support bases 12, 22, and 32, the support bases 12, 22, and 32 are equipped with infinite extendability. Meanwhile, the locating devices 142 and 342 can not only enable support bases 12, 22, and 32 to be fixed, but also enable the installment of the electrical connecting device 37 of the power distribution devices.

The embodiments shown and described above are only examples. Many details are often found in the art such as the other features of a hanger apparatus. Therefore, many such details are neither shown nor described. Even though numerous characteristics and advantages of the present technology have been set forth in the foregoing description, together with details of the configuration and function of the present disclosure, the disclosure is illustrative only, and changes may be made in the details, including in matters of shape, size, and arrangement of the parts within the principles of the present disclosure, up to and including the full extent established by the board general meaning of the terms used in the claims. It will therefore be appreciated that the embodiments described above may be modified within the scope of the claims.

What is claimed is:

1. A hanger apparatus, comprising:
   at least one support base having a containing groove and at least one support post; wherein the containing groove has at least one locating device and at least one fastening component, the locating device is configured to fix the support base on a fixture, the fastening component is installed at two end portions of the containing groove, the fastening component is combinable with the fastening component of another support base, the support post has a support component, the support component is configured to connect with a hanging object.

2. The hanger apparatus as claimed in claim 1, wherein, the support base comprises an expansion component having a concave slot, the concave slot has substantially the same configuration as the containing groove, the two end portions of the concave slot each has a connection component, one of the connection components and the fastening component are configured to correspondingly combine and extend the installation of the support base.

3. The hanger apparatus as claimed in claim 2, wherein, the configuration of the expansion component is a line-shape, a cross-shape, an H-shape, or an L-shape.

4. The hanger apparatus as claimed in claim 1, wherein, the support base comprises an electrical connecting device being installed inside the containing groove, the electrical connecting device has at least one electrical connecting socket and a conductive connector, the electrical connecting socket connects to a power source and the conductive connector has at least one conductive terminals.

5. The hanger apparatus as claimed in claim 4, wherein, the electrical connecting device includes at least one input port and at least one output port.

6. The hanger apparatus as claimed in claim 1, wherein, the fixture is a wall surface, a pedestal support frame, a vertical support frame.

7. The hanger apparatus as claimed in claim 6, wherein, the pedestal support frame installs a fixed base at an end of the support base, the vertical support frame respectively installs fixed bases at the two ends of the support base.

8. The hanger apparatus as claimed in claim 1, wherein, the supporting component is a protruding button being installed at an end portion of the support post, a gap is defined between the protruding button and the support post.

* * * * *